United States Patent
Takahashi et al.

(10) Patent No.: US 8,309,866 B2
(45) Date of Patent: Nov. 13, 2012

(54) WEIGHT CHECKING APPARATUS HAVING MEASURING AND PROCESSING PORTIONS

(75) Inventors: Atsushi Takahashi, Ritto (JP); Hirokazu Kuribayashi, Ritto (JP)

(73) Assignee: Ishida Co., Ltd., Tokyo (JP)

( * ) Notice: Subject to any disclaimer, the term of this patent is extended or adjusted under 35 U.S.C. 154(b) by 292 days.

(21) Appl. No.: 12/733,503

(22) PCT Filed: Oct. 7, 2008

(86) PCT No.: PCT/JP2008/068203
§ 371 (c)(1),
(2), (4) Date: Mar. 4, 2010

(87) PCT Pub. No.: WO2009/057425
PCT Pub. Date: May 7, 2009

(65) Prior Publication Data
US 2010/0212973 A1    Aug. 26, 2010

(30) Foreign Application Priority Data
Nov. 2, 2007 (JP) .................................. 2007-286173

(51) Int. Cl.
*G01G 21/28* (2006.01)
(52) U.S. Cl. ........................ 177/126; 177/145; 177/238
(58) Field of Classification Search .................. 177/119, 177/145, 238, 126
See application file for complete search history.

(56) References Cited

U.S. PATENT DOCUMENTS

| 4,557,341 A * | 12/1985 | Soederholm ..................... 177/16 |
| 6,161,891 A * | 12/2000 | Blakesley .................. 296/65.01 |
| 6,803,529 B2 * | 10/2004 | Takahashi ..................... 177/119 |
| 7,626,130 B2 * | 12/2009 | Scholpp ........................ 177/238 |
| 2007/0012487 A1 * | 1/2007 | Becker et al. ................. 177/144 |
| 2009/0139774 A1 * | 6/2009 | Takayasu et al. ............. 177/136 |
| 2010/0101871 A1 * | 4/2010 | Dale ................................ 177/1 |
| 2011/0303469 A1 * | 12/2011 | Saito et al. .................... 177/136 |

FOREIGN PATENT DOCUMENTS

| JP | 6-8743 | 2/1994 |
| JP | 9-297051 | 11/1997 |
| JP | 11-351948 | 12/1999 |
| JP | 2001-088925 | 4/2001 |
| JP | 2002-116079 | 4/2002 |
| JP | 2004-338823 | 12/2004 |

OTHER PUBLICATIONS

Chinese Office Action dated Aug. 29, 2011 in Application No. 2008-80106463.9.
International Search Report (Form PCT/ISA/210) for International Application No. PCT/JP2008/068203, mailed Jan. 13, 2009.
Patent Abstract of Japan, Publication No. 2001-088925, Publication Date Apr. 3, 2001.
English Translation of Japanese Publication No. 2001-088925, Publication Date Apr. 3, 2001.

(Continued)

*Primary Examiner* — Randy W Gibson
(74) *Attorney, Agent, or Firm* — Staas & Halsey LLP

(57) ABSTRACT

Apparatus for changing a position of device for measuring a weight of an object. The apparatus includes a conveyor portion, a measuring portion which also conveys the object and measures a weight of the object, and a pair of rails which extend along a conveying direction of the object and onto which the conveying and measuring portions are movably attached.

3 Claims, 14 Drawing Sheets

OTHER PUBLICATIONS

Patent Abstract of Japan, Publication No. 2004-338823, Publication Date Dec. 2, 2004.
English Translation of Japanese Publication No. 2004-338823, Publication Date Dec. 2, 2004.
Patent Abstract of Japan, Publication No. 2002-116079, Publication Date Apr. 19, 2002.
English Translation of Japanese Publication No. 2002-116079, Publication Date Apr. 19, 2002.
International Search Report mailed Jan. 13, 2009 in corresponding International Patent Application PCT/JP2008/068203.
Japanese Office Action dated May 8, 2012 in Application No. 2007-286173.

* cited by examiner

F I G. 1
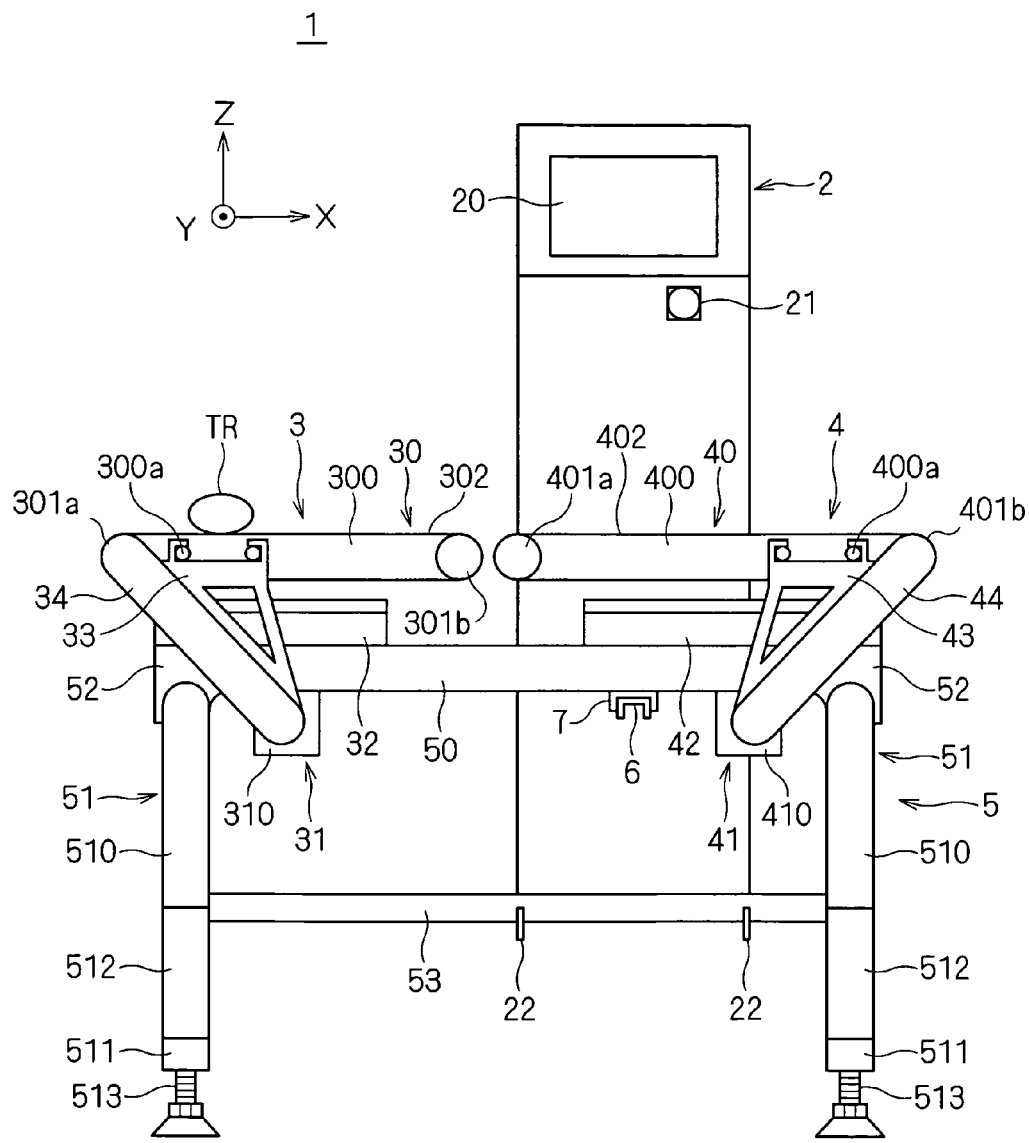

WEIGHT CHECKING APPARATUS HAVING MEASURING AND PROCESSING PORTIONS

CROSS REFERENCE TO RELATED APPLICATIONS

This application claims the benefit under 35 U.S.C. Section 371, of PCT International Application No. PCT/JP2008/068203, filed Oct. 7, 2008, which claimed priority to Japanese Application No. 2007-286173, filed Nov. 2, 2007 in the Japanese Patent Office, the disclosures of which are incorporated herein by reference.

TECHNICAL FIELD

The present invention relates to a weight checking apparatus which checks a weight of a check object.

BACKGROUND ART

Conventionally, there have been proposed various technologies related to a weight checking apparatus which checks weights of products. For example, Patent Documents 1 and 2 disclose the technology of adjusting a height of a leg of a frame which supports, for example, a conveyor for conveying products to thereby adjust a height of a conveying surface for the products. In addition, Patent Document 3 discloses the technology related to a weight checking apparatus.

Patent Document 1: Japanese Patent Application Laid-Open No. 2001-88925
Patent Document 2: Japanese Patent Application Laid-Open No. 2002-116079
Patent Document 3: Japanese Patent Application Laid-Open No. 2004-338823

Also as described in Patent Documents 1 to 3, the weight checking apparatus is provided with a measuring portion which includes a conveyor for conveying check objects and measures weights of the check objects which are conveyed by the conveyor. In some cases, other device is disposed at a preceding stage or a subsequent stage of this measuring portion, and a position of the measuring portion is required to be changed in accordance with a specification change of the other device or a specification change of the measuring portion itself. For example, in the weight checking apparatus described in Patent Document 2, the take-in conveyor is installed, at the preceding stage of the measuring portion, adjacent to the measuring conveyor included in the measuring portion. In a case where a length of the measuring conveyor or the take-in conveyor is changed in accordance with a change of types of the check objects, and if the position of the take-in conveyor cannot be moved due to a limitation in installation environment or the like in such a case, the position of the measuring portion may be required to be moved overall to the preceding stage or the subsequent stage.

In the apparatus of Patent Document 2, also in a case where another take-in conveyor is additionally installed between the measuring conveyor and the take-in conveyor, if the position of the original take-in conveyor cannot be moved due to a limitation in installation environment or the like, the position of the measuring portion is required to be moved overall to the subsequent stage.

DISCLOSURE OF INVENTION

The present invention has been made in view of the above, and an object thereof is to provide a technology capable of easily changing a position of a measuring portion which measures a weight of a check object in accordance with a change of specifications or addition of specifications.

In order to solve the above-mentioned problems, a first aspect of the present invention relates to a weight checking apparatus checking a weight of a check object, which includes: a measuring portion including a conveying portion conveying a check object and measuring a weight of the check object conveyed by the conveying portion;

and at least one rail-like member extending along a conveying direction of the check object, onto which the measuring portion is mounted so that a position thereof is capable of being changed.

Further, according to a second aspect of the weight checking apparatus of the present invention, in the first aspect: the at least one rail-like member is composed of a plurality of rail-like members disposed in parallel with each other; and at least a part of the measuring portion is positioned between the plurality of rail-like members.

Further, according to a third aspect of the present invention, in the first or second aspect, the weight checking apparatus further includes a processing portion including a conveying portion conveying the check object and performing a predetermined processing on the check object, wherein the processing portion is mounted onto the at least one rail-like member so that the conveying portion thereof is disposed adjacent to the conveying portion of the measuring portion along the conveying direction.

Further, according to a fourth aspect of the weight checking apparatus of the present invention, in the third aspect, the processing portion is mounted onto the at least one rail-like member so that a position thereof is capable of being changed.

Further, according to a fifth aspect of the present invention, in the third or fourth aspect, the weight checking apparatus further includes a given device detachably mounted onto the at least one rail-like member.

According to the first to fifth aspects of the weight checking apparatus of the present invention, the measuring portion is mounted onto the rail-like member so that the position thereof is capable of being changed, whereby it is possible to easily change the position of the measuring portion in accordance with a change of specifications or addition of specifications.

In particular, according to the second aspect, at least a part of the measuring portion is positioned between the plurality of rail-like members, whereby it is possible to make the position of the measuring portion lower compared with a case where the entire measuring portion is positioned above the rail-like member. Accordingly, it is possible to suppress an unnecessary vibration from being applied to the measuring portion, which prevents a decrease in measurement accuracy of the measuring portion.

In particular, according to the third aspect, the measuring portion and the processing portion are mounted onto the same rail-like member, with the result that it is possible to change the position of the measuring portion while suppressing a change in height relationship between a conveying surface of the measuring portion and a conveying surface of the processing portion. Accordingly, it is not required to adjust the height of the conveying surface between the measuring portion and the processing portion.

In particular, according to the fourth aspect, it is possible to change not only the position of the measuring portion but also the position of the processing portion by using the rail-like member, which enables flexible adaptation to a change of specifications or addition of specifications.

In particular, according to the fifth aspect, it is possible to detachably frame the given device onto rail-like member onto which the measuring portion and the processing portion are mounted, whereby it is possible to add specifications easily.

These and other objects, features, aspects and advantages of the present invention will become more apparent from the following detailed description of the present invention when taken in conjunction with the accompanying drawings.

BRIEF DESCRIPTION OF DRAWINGS

FIG. 1 is a front view showing a structure of a weight checking apparatus according to an embodiment of the present invention.

BEST MODE FOR CARRYING OUT THE INVENTION

Figure 2:
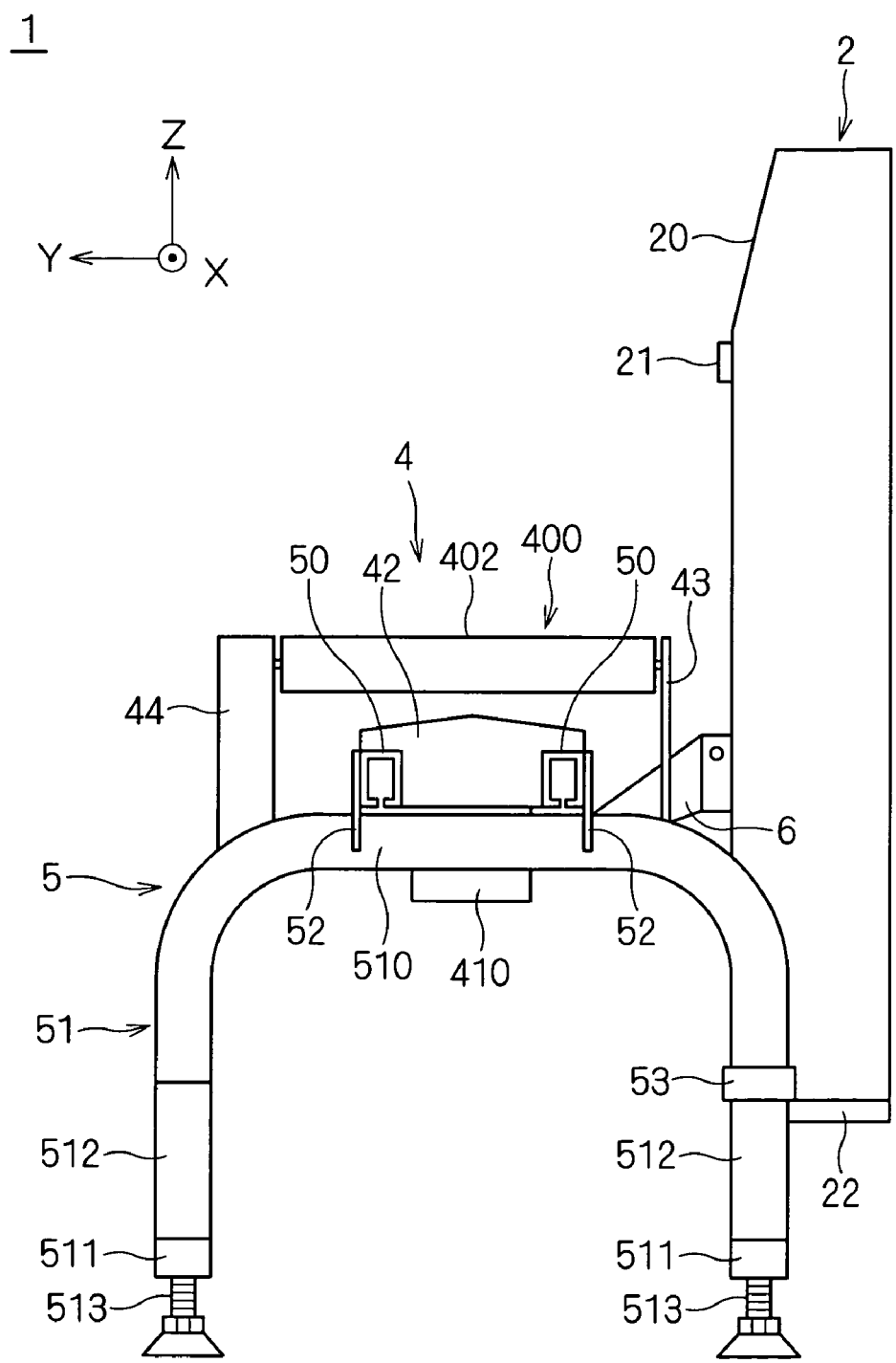
FIG. 2 is a side view showing the structure of the weight checking apparatus according to the embodiment of the present invention.

FIG. 1 is a front view showing a structure of a weight checking apparatus 1 according to an embodiment of the present invention, and FIG. 2 is a side view showing the structure of the weight checking apparatus 1. The weight checking apparatus 1 according to the present embodiment takes in a check object TR supplied from an apparatus at a preceding stage, measures a weight thereof while conveying the check object TR, and thereafter supplies the check object TR to an apparatus at a subsequent stage. The weight checking apparatus 1 determines whether or not the measured weight is within a predetermined range and displays the determination results. In the following description, there is used an XYZ orthogonal coordinate system in which a left-right direction, a front-back direction and a vertical direction of the weight checking apparatus 1 are indicated by an X-axis direction, a Y-axis direction and a Z-axis direction, respectively.

As shown in FIGS. 1 and 2, the weight checking apparatus 1 according to the present embodiment includes an electrical equipment box 2 which accommodates various types of electronic components, a take-in portion 3 functioning as a processing portion which takes in the check object TR and supplies the check object TR to a measuring portion 4, the measuring portion 4 functioning as a detection portion which detects a weight of the check object TR supplied from the take-in portion 3, and a frame 5 which supports the electrical equipment box 2, the take-in portion 3 and the measuring portion 4.

The electrical equipment box 2 is a vertically long case which extends along the Z-axis direction, and is disposed behind the measuring portion 4 and the take-in portion 3. The electrical equipment box 2 includes an operation portion 20, a control portion (not shown) which controls an overall action of the weight checking apparatus, and the like. The operation portion 20 is composed of, for example, a touch panel display and also has a display function. The operation portion 20 is mounted in the electrical equipment box 2 so that a display screen thereof is exposed from a front surface of the electrical equipment box 2. The control portion accommodated in the electrical equipment box 2 is composed of a CPU, a memory and the like, and determines whether or not the weight measured by the measuring portion 4 is within the predetermined range to display the determination results on the display screen of the operation portion 20. In addition, the control portion controls actions of the measuring portion 4 and the take-in portion 3 in accordance with an operation performed for the operation portion 20. A power switch 21 which controls on/off of power of the weight checking apparatus 1 is mounted onto the front surface of the electrical equipment box 2.

The measuring portion 4 measures the weight of the check object TR taken in by the take-in portion 3 while conveying it toward the apparatus at the subsequent stage. A measurement result by the measuring portion 4 is input to the above-mentioned control portion provided in the electrical equipment box 2, and the control portion determines whether or not the weight of the check object TR is within the predetermined range based on the received measurement result. Then, the control portion displays a determination result thereof on the display screen of the operation portion 20 together with the weight of the check object TR.

Figure 3:
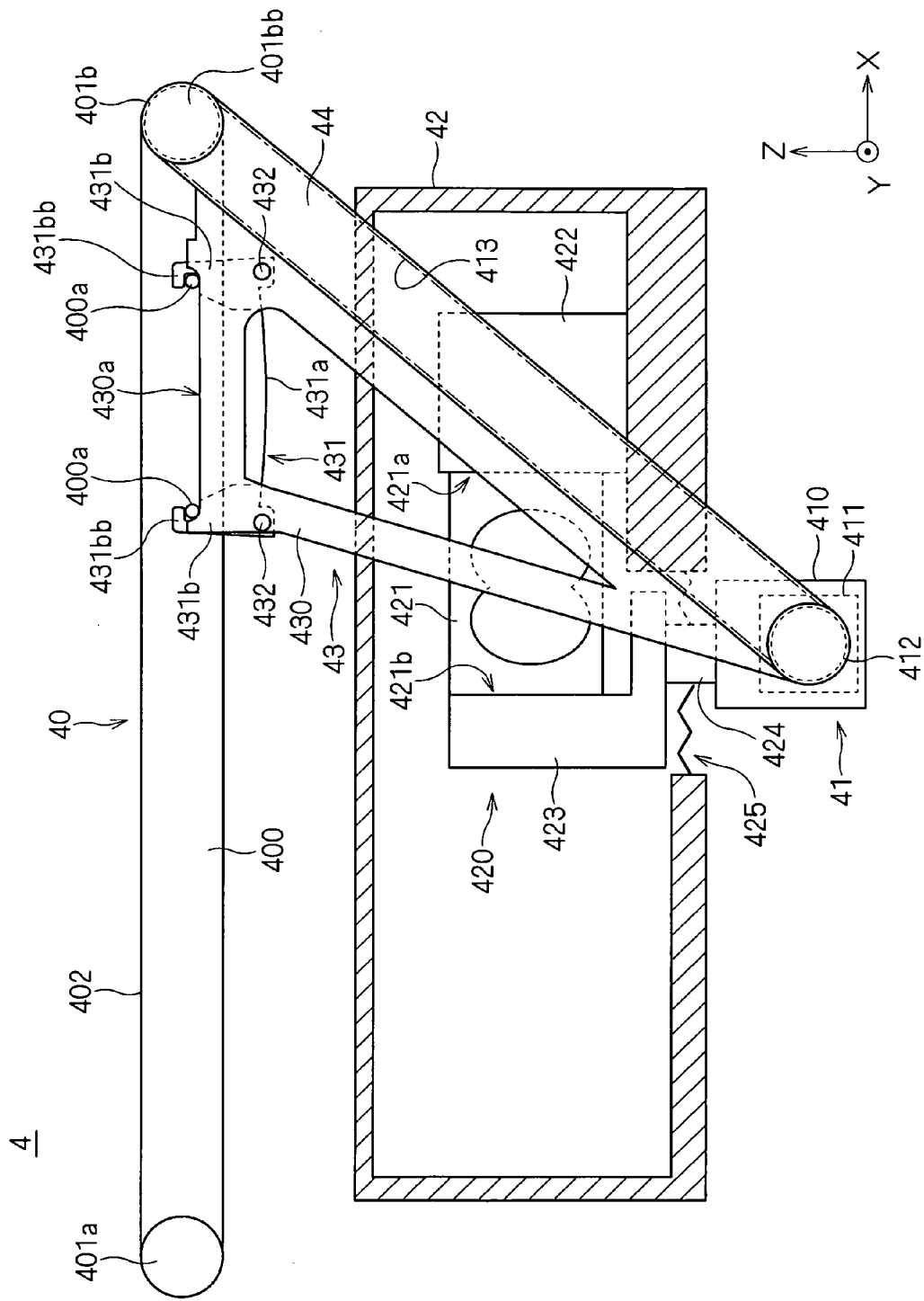
FIG. 3 is a side view showing a structure of a measuring portion according to the embodiment of the present invention.

FIG. 3 is a side view showing a detailed structure of the measuring portion 4. Note that a structure in cross section of a measuring box 42 descried below is shown for understanding of an inside structure thereof. As shown in FIGS. 1 to 3, the measuring portion 4 includes a measuring conveyor 40 functioning as a conveying portion which conveys the check object TR in the X-axis direction, a driving portion 41 which drives the measuring conveyor 40, and the measuring box 42 which accommodates a load detection portion 420.

The measuring conveyor 40 includes a conveyor frame 400, a driven roller 401a and a driving roller 401b which are respectively mounted on both ends of the conveyor frame 400 in the X-axis direction, and an endless conveying belt 402 which is wound between the driven roller 401a and the driving roller 401b.

The measuring box 42 is a horizontally long case extending along the X-axis direction. The load detection portion 420 of the measuring box 42 is a weight sensor constituting a so-called Roberval mechanism and includes a load cell 421 which is a strain element. One end 421a of the load cell 421 is fixed to a mounting member 422 fixed to an inner bottom surface of the measuring box 42. The measuring box 42 is supported by the frame 5, and thus the one end 421a of the load cell 421 acts as a fixed end of the load cell 421. In addition, the other end 421b of the load cell 421 acts as a free end (hereinafter, merely referred to as a free end 421b). The free end 421b of the load cell 421 is mounted to a motor box 410 of the driving portion 41 described below by an L-shaped mounting member 423 and a mounting member 424 therebelow. The mounting member 424 is substantially flush with the inner bottom surface of the measuring box 42 and is pinched by a diaphragm 425.

The driving portion 41 includes a driving motor 411 accommodated in the motor box 410 and a timing belt 413. The timing belt 413 is wound between a driving pulley 412 of the driving motor 411 and a driven pulley 401bb provided at an end portion on a front side in a center axial direction (Y-axis direction) of the driving roller 401b of the measuring conveyor 40. The timing belt 413 transmits driving force of the driving motor 411 to the driving roller 401b to rotate the driving roller 401b, whereby the conveying belt 402 is moved and the check object TR is conveyed to the apparatus at the subsequent stage.

A pair of support members 43, which support the measuring conveyor 40 from both sides in the Y-axis direction, are each detachably mounted on both sides of the motor box 410 in the Y-axis direction. A pair of fixing pins 400a are provided on each of both side surfaces of the conveyor frame 400, and the pair of fixing pins 400a are disposed with a predetermined distance on a straight line parallel to a top surface of the conveyor frame 400. Each support member 43 extends from the motor box 410 to the measuring conveyor 40, and an end portion thereof on the measuring conveyor 40 side engages with the pair of fixing pins 400a provided on the side surface of the conveyor frame 400.

In addition, the measuring portion 4 is provided with a cover member 44 which covers the driving pulley 412, the driven pulley 401bb, and the timing belt 413 wound therebetween.

Each support member 43 includes a support bracket 430 and an engaging member 431. The support bracket 430 is a plate-like member which is substantially triangular in shape and includes an opening inside thereof. The above-mentioned cover member 44 is formed integrally with the support bracket 430 on the front side. A lower part of the support bracket 430 is detachably fixed to the motor box 410 by fixing means (not shown). In addition, at an upper end portion of the support bracket 430, there is formed a support end 430a in a concave shape, which supports two fixing pins 400a of the conveyor frame 400 from downward. The support bracket 430 is fixed to the motor box 410 so that the support end 430a is disposed horizontally.

The engaging member 431 is mounted onto an upper portion of the support bracket 430 and engages with the pair of fixing pins 400a of the conveyor frame 400. The support bracket 430 is fixed to the motor box 410 so that the engaging member 431 is positioned on the measuring conveyor 40 side. The engaging member 431 includes a plate-spring-like switching portion 431a which has bending elasticity and a pair of engaging portions 431b which integrally extend upward from both ends thereof. Each upper end portion 431bb of the pair of engaging portions 431b has an inwardly-bent hook shape, and engages with the fixing pin 400a of the conveyor frame 400 from an outside thereof. Each engaging portion 431b is mounted onto the support bracket 430 and is pivotally supported by a mounting member 432. Accordingly, each engaging portion 431b is capable of rotating about the mounting member 432. Two engaging portions 431b are coupled to each other by the switching portion 431a, and elastic constraint force acts between two engaging portions 431b by the switching portion 431a. A distance between two mounting members 432 is set to be slightly shorter than a natural length of the switching portion 431a. For this reason, the switching portion 431a is in a stable state when being in a convexly bent shape and a concavely bent shape not in a linear shape.

In the engaging member 431 having such a structure, each of the pair of engaging portions 431b rotates such that the upper end portion 431bb thereof faces outside when the switching portion 431a is in the convexly bent shape, which increases a distance between the upper end portions 431bb of the pair of engaging portions 431b. In contrast to this, when the switching portion 431a is in the concavely bent shape, each of the pair of engaging portions 431b rotates such that the upper end portion 431bb thereof faces inside, which decreases the distance between the upper end portions 431bb of the pair of engaging portions 431b. The engagement of the engaging portions 431b with the pair of fixing pins 400 is released when a center portion of the switching portion 431a in the concavely bent state is pushed up from downward, whereas the engaging portions 431b engage with the pair of fixing pins 400a when the center portion of the switching portion 431a in the convexly bent shape is pushed down from upward. The support bracket 430 fixed to the motor box 410 supports the pair of fixing pins 400a from downward, and further, the engaging member 431 engages with the pair of fixing pins 400a, with the result that it is possible to support the measuring conveyor 40 by the pair of support members 43 while keeping the upper surface of the conveyor frame 400 horizontal.

In the measuring portion 4 according to the present embodiment which has the above-mentioned structure, a load of the measuring conveyor 40 itself and a load applied on the upper portion thereof are transmitted to the free end 421b of the load cell 421 through the support member 43, the motor box 410, the mounting member 424 and the mounting member 423. The measuring conveyor 40, the support member 43, the driving portion 41, the cover member 44 and the mounting members 423 and 424 serve as a so-called tare, and a total weight thereof acts on the free end 421b as a tare weight.

When the check object TR is supplied from the apparatus at the preceding stage, the take-in portion 3 separates this check object TR from the other subsequent check object TR and conveys this check object TR to the measuring portion 4. Accordingly, a single check object TR is put on the measuring conveyor 40 of the measuring portion 4, whereby it is possible to measure a weight of one check object TR.

Outwardly, the take-in portion 3 has a structure similar to that of the measuring portion 4. The take-in portion 3 includes a take-in conveyor 30 functioning as a conveying portion which conveys the check object TR in the X-axis direction and a driving portion 31 which drives the take-in conveyor 30. The take-in conveyor 30 includes a conveyor frame 300, a driving roller 301a and a driven roller 301b which are respectively mounted on both ends of the conveyor frame 300 in the X-axis direction, and an endless conveying belt 302 which is wound between the driving roller 301a and the driven roller 301b. The take-in conveyor 30 is disposed adjacent to the measuring conveyor 40 in the X-axis direction so that a height of a conveying surface thereof coincides with a height of a conveying surface of the measuring conveyor 40.

The driving portion 31 includes a motor box 310 which accommodates a driving motor (not shown) which drives the take-in conveyor 30. A timing belt (not shown) is wound between a driving pulley of the driving motor of the motor box 310 and a driven pulley at an end portion on a front side of the driving roller 301a. When this timing belt transmits a driving force of the driving motor to the driving roller 301a to rotate the driving roller 301a, the conveying belt 302 is moved, whereby the check object TR is conveyed toward the measuring portion 4. The motor box 310 is mounted to a take-in box 32 supported by the frame 5. The take-in box 32 accommodates electric wiring connected to the driving motor of the motor box 310, and the like.

A pair of support members 33 which support the take-in conveyor 30 from both sides in the Y-axis direction are mounted on both sides of the motor box 310 in the Y-axis direction. The support member 33 has a structure similar to that of the support member 43 of the measuring portion 4. The support member 33 extends from the motor box 310 to the take-in conveyor 30, and an end portion thereof on the take-in conveyor 30 side engages with two fixing pins 300a provided on a side surface of the conveyor frame 300.

In addition, similarly to the measuring portion 4, the take-in portion 3 is provided with a cover member 34 which covers the driving pulley of the driving motor of the motor box 310, the driven pulley of the driving roller 301a, and the timing belt which is would therebetween. This cover member 34 and a support bracket of the support member 33 on the front side are integrally formed.

The frame 5 includes a pair of rail-like members 50 which extend along the X-axis direction and a pair of leg members 51 which support the rail-like members 50. The pair of rail-like members 50 support the measuring box 42 of the measuring portion 4 and the take-in box 32 of the take-in portion 3. The pair of leg members 51 being in contact with the ground are each formed in an inverted U-shape, and are disposed so as to be opposed to each other with a predetermined distance in the X-axis direction. The pair of rail-like members 50 are disposed in parallel with each other with a predetermined distance and extend from one of the pair of leg members 51 to the other thereof. The pair of rail-like members 50 are mounted onto horizontal parts of the pair of leg members 51 which extend along the Y-axis direction (front-back direction) by a plurality of mounting brackets 52.

Each of the leg members 51 includes a first leg portion 510 which has a shallow-depth inverted-U-shape, a pair of second leg portions 511 for adjusting a height of the leg member 51, a pair of cover members 512 and a pair of jack bolts 513. One of the pair of second leg portions 511 is coupled to one end of the first leg portion 510, and the other of the pair of second leg portions 511 is coupled to the other end of the first leg portion 510. As described below, the second leg portion 511 includes a screw portion in an upper portion thereof, and the cover member 512 is mounted to the second leg portion 511 so as to cover this screw portion. Then, the jack bolt 513 is mounted to a lower end of each of the second leg portions 511.

In addition, the frame 5 is provided with a support member 53 which supports the electrical equipment box 2. The support member 53 extends along the X-axis direction, and is constructed between vertical parts which extend in the vertical direction on the back side in the pair of leg members 51. The support member 53 is mounted to a lower end portion of the electrical equipment box 2 by a mounting bracket 22.

Further, the weight checking apparatus 1 is provided with a fixing member 6 for fixing the electrical equipment box 2 to the frame 5. One end of the fixing member 6 is mounted on a side slightly lower than a center of the front surface of the electrical equipment box 2. The other end of the fixing member 6 sufficiently reaches the rail-like member 50 on the back side, and is mounted to a mounting bracket 7 fixed to a bottom surface of the rail-like member 50. Accordingly, the electrical equipment box 2 is supported by and fixed to the frame 5.

(Detailed Structure of Leg Member)

Figure 4:
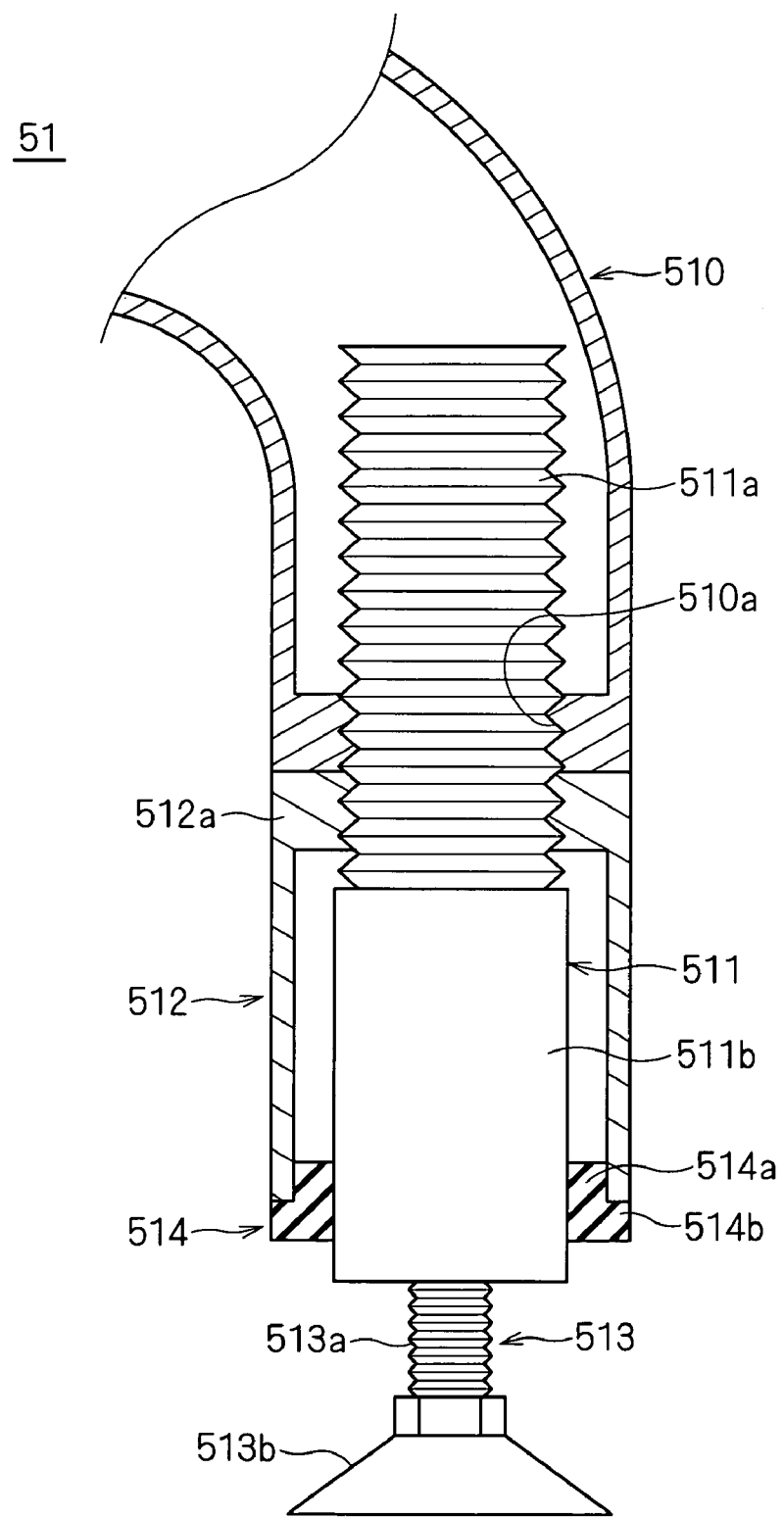
FIG. 4 is a side view showing a structure of a leg member according to the embodiment of the present invention.

Next, a detailed structure of the leg member 51 will be described. FIG. 4 is a side view showing the structure of the leg member 51 in detail. For the sake of description, in FIG. 4, the structures of the first leg portion 510, the cover member 512 and the bush member 514 are shown in cross section.

As shown in FIG. 4, the first leg portion 510 is formed in a round pipe shape and includes screw holes 510a at both end portions thereof. The second leg portion 511 extending along the Z-axis direction is also formed in a round pipe shape, and includes, from an upper end thereof to a center portion thereof, a screw portion 511a which is screwed with the screw hole 510a of the first leg portion 510. The second leg portion 511 is manufactured by forming screw grooves from an upper end of a surface to a center portion of a cylindrical member, and thus in the second leg portion 511, an inner diameter of the screw portion 511a and an inner diameter of a screw-free portion 511b in which a screw is not formed are the same with each other. Further, an outermost diameter of the screw portion 511a (outer diameter which links screw threads on the surface of the screw portion 511a) and an outer diameter of the screw-free portion 511b are the same with each other. The second leg portion 511 is coupled to the first leg portion 510 when the screw portion 511a thereof is screwed with the screw hole 510a of the first leg portion 510. Thereafter, the outermost diameter of the screw portion 511a and the outer diameter of the screw-free portion 511b are combined to be merely referred to as an "outer diameter of the second leg portion 511".

The cover member 512 extending along the Z-axis direction is formed in a round pipe shape similarly to the first leg portion 510 and the second leg portion 511. The cover member 512 is mounted to the second leg portion 511 so as to cover at least a peripheral surface of the screw portion 511a, which is exposed from the first leg portion 510. The cover member 512 includes, at an upper end portion thereof, a nut portion 512a which screws with the screw portion 511a, and is mounted to the second leg portion 511 when the nut portion 512a thereof is screwed with the screw portion 511a exposed from the first leg portion 510.

In the case of mounting the cover member 512 to the second leg portion 511, first, the cover member 512 is caused to cover the second leg portion 511 from a lower end side thereof, and then the cover member 512 is caused to rotate about the shaft center thereof. Then, the nut portion 512a of the cover member 512 is screwed with the screw portion 511a of the second leg portion 511, which is exposed from the first leg portion 510. Then, the cover member 512 is further caused to rotate so that the nut portion 512a is fastened, whereby an upper end of the cover member 512 and a lower end of the first leg portion 510 come into contact with each other. Accordingly, the second leg portion 511 becomes difficult to be loosened from the first leg portion 510.

As described above, in the present embodiment, the nut portion 512a provided at the upper end portion of the cover member 512 is fastened to the screw portion 511a exposed from the first leg portion 510, with the result that the exposed screw portion 511a is shielded with the cover member 512, and that the second leg portion 511 is prevented from being loosened from the first leg portion 510 to be detached therefrom. If the screw portion 511a is exposed to an outside thereof, dust is likely to be accumulated in the screw grooves thereof, which causes a problem in terms of hygiene and also necessitates frequent cleaning of the frame 5. However, when the screw portion 511a exposed from the first leg portion 510 is covered with the cover member 512 as in the present embodiment, dust is unlikely to be accumulated in the frame 5, which is excellent in terms of hygiene and makes cleaning of the frame 5 easier. Note that the outer diameter of the cover member 512 and the outer diameter of the first leg portion 510 are set to be the same with each other, whereby it is possible to prevent a gap from being generated on a surface of the leg member 51.

Further, in the present embodiment, an inner diameter of a part of the cover member 512 except for the nut portion 512a is set to be slightly larger than the outer diameter of the second leg portion 511. This is because, if the inner diameter of the cover member 512 and the outer diameter of the second leg portion 511 are almost the same with each other, a deviation of the center shaft which is generated therebetween cannot be accommodated, whereby the nut portion 512a is difficult to be screwed with the screw portion 511a. Therefore, in the present embodiment, a gap is generated between the part of the second leg portion 511 except for the nut portion 512a and the cover member 512. The second leg portion 511 and the cover member 512 wobble when there is a gap therebetween, and accordingly the cover member 512 is less conducive to improvement in rigidity of the leg member 51.

Therefore, in the present embodiment, the bush member 514 is inserted into the gap between the second leg portion 511 and the cover member 512. As a result, it is possible to prevent the second leg portion 511 and the cover member 512 from wobbling, and accordingly the cover member 512 is sufficiently conducive to improvement in rigidity of the leg member 51. That is, rigidity of the leg member 51 is improved.

Figure 5:
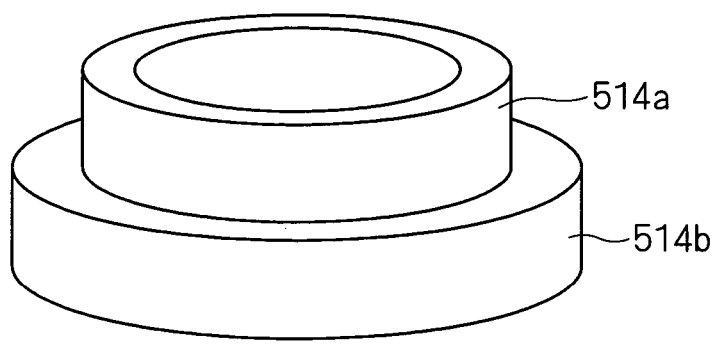
FIG. 5 is a side view showing a structure of a bush member according to the embodiment of the present invention.

FIG. 5 is a perspective view showing a structure of the bush member 514. As shown in FIG. 5, the bush member 514 includes, at an upper portion thereof, a first circular part 514a which has a slightly small outer diameter and is slightly thin, and at a lower part thereof, a second circular part 514b which has a slightly large outer diameter and is slightly thick. An inner diameter of the first circular part 514a and an inner diameter of the second circular part 514b are the same with each other, and the first circular part 514a communicates into the second circular part 514b. The inner diameters of the first circular part 514a and the second circular part 514b and an outer diameter of the second leg portion 511 are almost the same with each other, and the outer diameter of the first circular part 514a and the inner diameter of the cover member 512 except for the nut portion 512a are almost the same with each other. In addition, an outer diameter of the second circular part 514b and the outer diameter of the cover member 512 are almost the same with each other.

In the case of mounting the bush member 514 having the above-mentioned structure to the leg member 51, the second leg portion 511 is passed through the bush member 514, whereby the first circular part 514a of the bush member 514 is fitted into the gap between the lower end portion of the cover member 512 and the second leg portion 511. Accordingly, the gap between the lower end portion of the cover member 512 and the second leg portion 511 opposed thereto is filled with the bush member 514. The outer diameter of the second circular part 514b is substantially the same as the outer diameter of the cover member 512, and thus the second circular part 514b does not protrude to an outside thereof.

Figure 6:
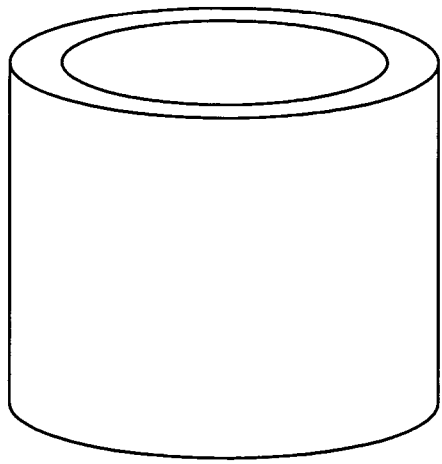
FIG. 6 is a side view showing a modification of the structure of the bush member according to the embodiment of the present invention.

Note that the bush member 514 is desirably formed of a material having higher elasticity than those of the second leg portion 511 and the cover member 512. For example, in a case where the first leg portion 510, the second leg portion 511 and the cover member 512 are formed of the same metal material, the bush member 514 is desirably formed of a resin such as polyacetal. In this manner, when the bush member 514 is formed of a material having high elasticity, the bush member 514 may absorb a vibration of the frame 5. As a result, it is possible to suppress adverse effects caused by the vibration to the measuring portion 4, that is, degradation in measurement accuracy. Alternatively, in a case where the bush member 514 is formed of a material having high elasticity such as a resin, the bush member 514 may have a simple cylindrical shape as shown in FIG. 6. In this case, the outer diameter of the bush member 514 is set to be slightly larger than the inner diameter of the cover member 512 except for the nut portion 512a. Accordingly, the gap between the lower end portion of the cover member 512 and the second leg portion 511 opposed thereto may be filled with the bush member 514 without causing the bush member 514 to become detached.

A screw hole (not shown) with which the jack bolt 513 is screwed is provided at the lower end portion of the second leg portion 511. The jack bolt 513 is composed of a screw portion 513a which is screwed with the screw hole at the lower end portion of the second leg portion 511 and a base portion 513b which supports the screw portion 513a. The screw portion 513a is manufactured by providing screw grooves in a rod-like member whose inside is filled, and is formed of a metal material. The jack bolt 513 is cause to rotate about the shaft center thereof, whereby the screw portion 513a intrudes into the second leg portion 511 or exits from the second leg portion 511. Accordingly, the height of the leg member 51 may be changed, whereby the height of the conveying surface for the check object TR may be adjusted. A nut (not shown) is also mounted to the screw portion 513a of the jack bolt 513, and when the nut is fastened, it is possible to prevent the jack bolt 513 from becoming loosened from the second leg portion 511.

Figure 7:
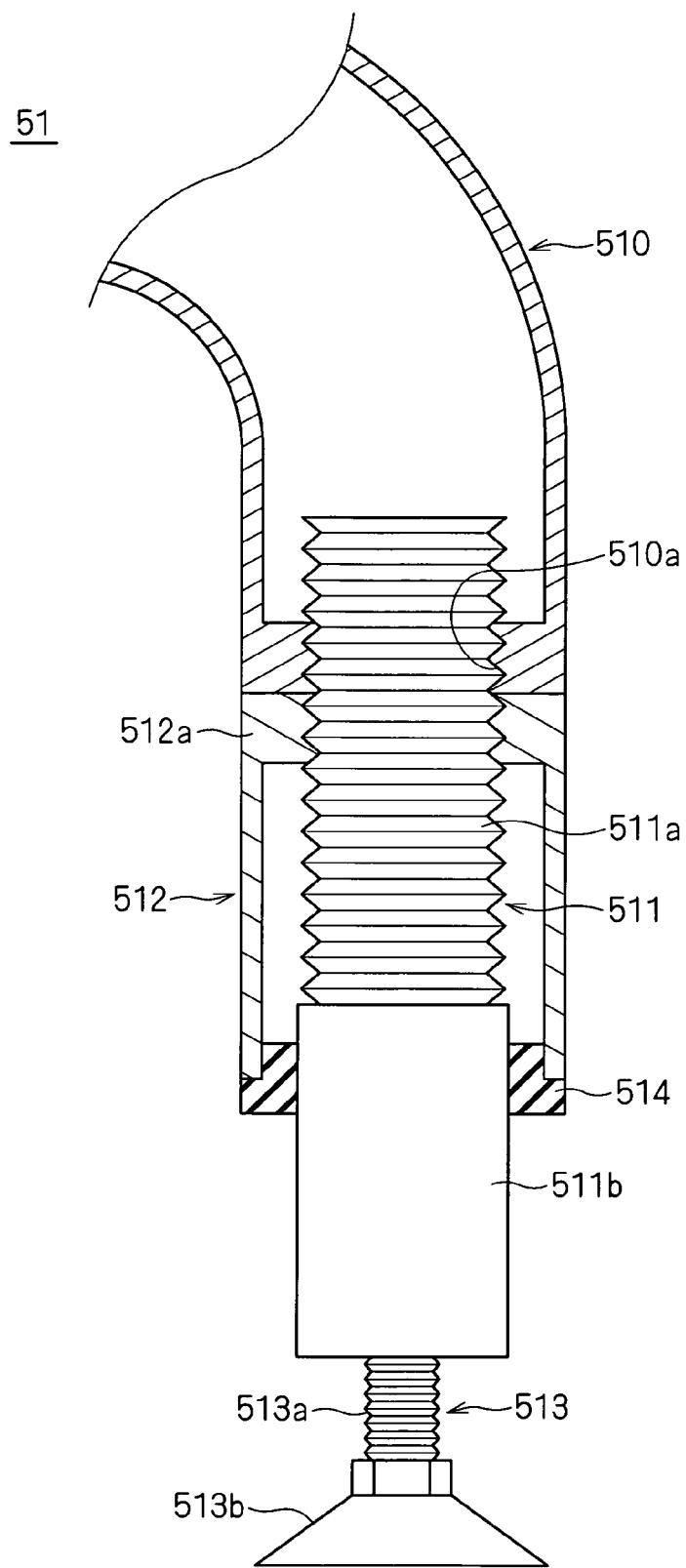
FIG. 7 is another side view showing the structure of the leg member according to the embodiment of the present invention.

In the present embodiment, not only the jack bolt 513 but also the second leg portion 511 is used to adjust the height of the leg member 51. The screw portion 511a intrudes into the first leg portion 510 when the second leg portion 511 is caused to rotate in a fixed direction about the shaft center thereof, whereas the screw portion 511a exits from the first leg portion 510 when the second leg portion 511 is caused to rotate in an opposite direction. This enables adjustment of the height of the leg member 51. An exposed amount from the first leg portion 510 in the second leg portion 511 decreases when the second leg portion 511 is caused to rotate to increase an intrusion amount of the screw portion 511a into the first leg portion 510, whereby the height of the leg member 51 is reduced. FIG. 4 shows a state in which the height of the leg member 51 is relatively reduced. On the other hand, an exposed amount from the first leg portion 510 in the second leg portion 511 increases when the intrusion amount of the screw portion 511a into the first leg portion 510 is reduced, whereby the height of the leg member 51 is increased. FIG. 7 shows a state thereof.

As described above, in the present embodiment, it is possible to easily adjust the height of the leg member 51 in accordance with a degree of the screw portion 511a of the second leg portion 511 intruding into the first leg portion 510. That is, the use of the second leg portion 511 enables adjustment of the height of the conveying surface for the check object TR in the measuring portion 4 and the take-in portion 3.

Further, the outer diameter of the second leg portion 511 is sufficiently larger than the outer diameter of the screw portion 513a of the jack bolt 513, with the result that it is possible to suppress degradation in rigidity of the leg member 51 even in a case where an intrusion amount of the screw portion 511a into the first leg portion 510 is reduced to increase the height of the leg member 51.

Note that if an exposed amount of the screw portion 513a of the jack bolt 513 is excessively increased, the rigidity of the leg member 51 may not be secured to cause a vibration in the leg member 51. Therefore, the jack bolt 513 is preferably used for fine adjustment of the height of the leg member 51, and the second leg portion 511 having a large outer diameter is preferably used in considerably changing the height of the leg member 51. Further, the jack bolt 513 is not necessarily required to be provided in the leg member 51.

(Support Structure For Measuring Portion and Take-In Portion)

Figure 8:
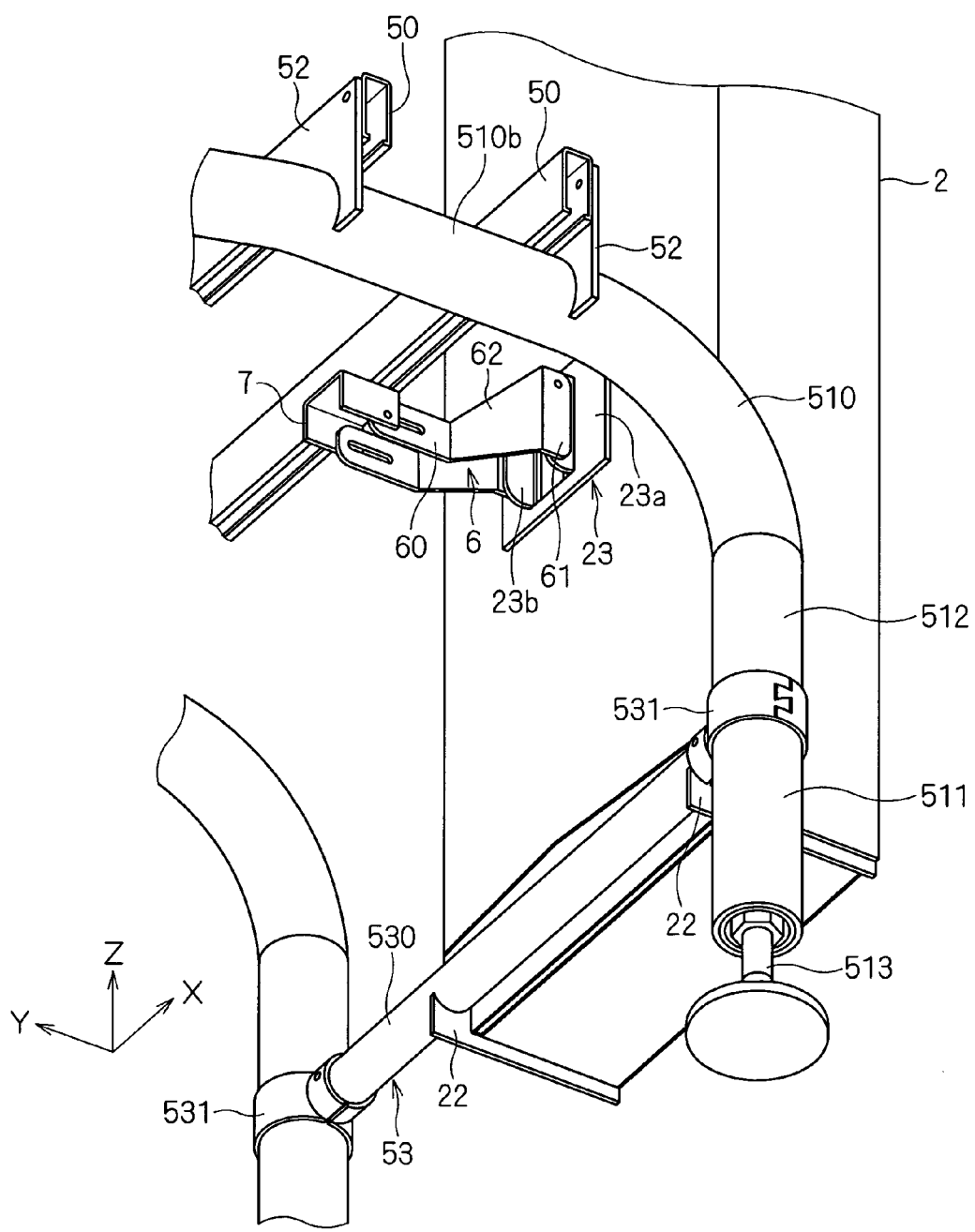
FIG. 8 is a perspective view showing the structure of the weight checking apparatus according to the embodiment of the present invention, which is viewed from obliquely downward.
Figure 9:
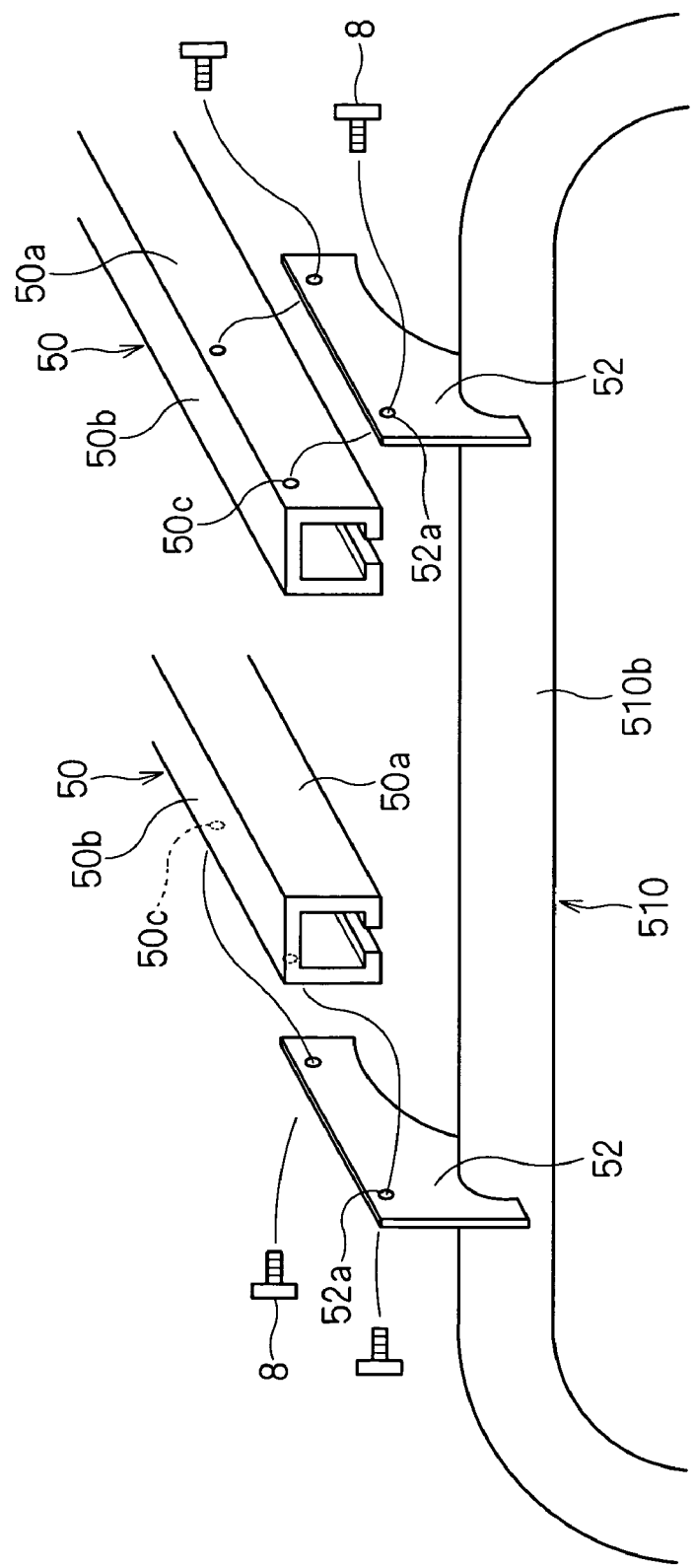
FIG. 9 is a view for describing a method of mounting a rail-like member onto the leg member.
Figure 10:
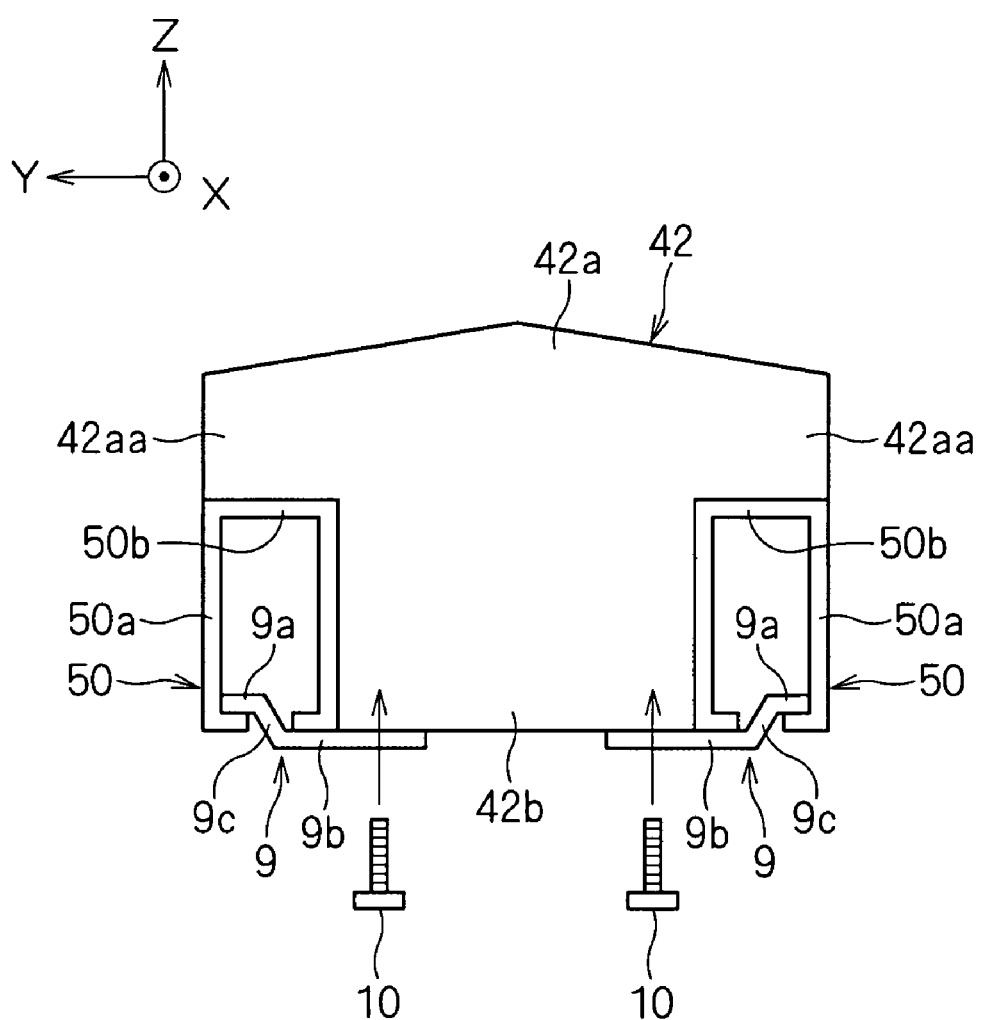
FIG. 10 is a view for describing a method of mounting the measuring portion and a take-in portion onto the rail-like member.

Next, a support structure for the measuring portion 4 and the take-in portion 3 will be described in detail. FIG. 8 is a perspective view showing the structure of the weight checking apparatus 1 which is viewed from obliquely below. FIG. 9 is a view for describing a method of mounting the rail-like member 50 onto the leg member 51. FIG. 10 is a view for describing a method of mounting the measuring portion 4 and the take-in portion 3 onto the rail-like member 50. Note that for the sake of description, the measuring portion 4 and the take-in portion 3 are not shown in FIG. 8.

As shown in FIGS. 8 and 9, in each of the first leg portions 510 of a pair of leg members 51, two mounting brackets 52 are welded to, with a predetermined distance, a horizontal part 510b extending along the Y-axis direction. Each mounting bracket 52, which is a plate-like member, is vertically arranged on the horizontal part 510b of the first leg portion 510, and protrudes inward from the horizontal part 510b, that is, toward the other first leg portion 510. Besides, two screw holes 52a are provided side by side in the X-axis direction at an upper end portion of each of the mounting brackets 52.

Each of the pair of rail-like members 50 has a shape of a bent plate-like member. Each rail-like member 50 includes a pair of flat-plate-like side plate portions 50a which extend in one direction and are disposed in parallel with each other and a flat-plate-like top plate portion 50b which connects upper ends of the pair of side plate portions 50a. Each lower end portion of the pair of side plate portions 50a is bent inward. At each of both end portions of the rail-like member 50, there are provided, in a vicinity of the upper end of one of the side plate portion 50a, two screw holes 50c arranged side by side in a longitudinal direction of the rail-like member 50.

When the rail-like member 50 is mounted to the mounting bracket 52, first, an end portion of the rail-like member 50 is superimposed on the mounting bracket 52 from an inside thereof so that two screw holes 50c of the rail-like member 50 and two screw holes 52a of the mounting bracket 52 are respectively superimposed on each other. Then, screws 8 are screwed with the superimposed screw holes 50c and 52c from an outside of the mounting bracket 52. Accordingly, the rail-like member 50 is mounted to the mounting member 52.

Next, the method of mounting the take-in portion 3 and the measuring portion 4 onto the rail-like member 50 will be described with reference to FIG. 10. The take-in portion 3 and the measuring portion 4 are mounted onto the rail-like member 50 in the similar manner, and thus the following description will be mainly given of the method of mounting the measuring portion 4 as a representative example.

As shown in FIG. 10, the measuring box 42 of the measuring portion 4 is composed of an upper portion 42a having a slightly large width and a lower portion 42b having a slightly small width, and has a T-shirt shape in side view in the long side direction (X-axis direction) and a horizontally long rectangular shape in side view in the short side direction (Y-axis direction). The upper portion 42a includes, at both ends thereof in the short side direction, protruding end portions 42aa protruding outward beyond a side surface of the lower portion 42b in the short side direction. The pair of rail-like members 50 which support the measuring box 42 support the protruding end portions 42aa of the upper portion 42a from a lower side thereof while sandwiching the lower portion 42b therebetween.

In the present embodiment, two fixing members 9 are used for fixing the measuring box 42 to a pair of rail-like members 50. One of two fixing members 9 is mounted to one of the pair of rail-like members 50 and the measuring box 42, while the other of two fixing members 9 is mounted to the other of the pair of rail-like members 50 and the measuring box 42. Each fixing member 9 has a shape of a bent plate-like member, and is composed of a first horizontal part 9a, a second horizontal part 9b and an inclined part 9c which connects both. The inclined part 9c extends obliquely downward from one end of the first horizontal part 9a and is continuous with one end of the second horizontal part 9b. In the fixing member 9, the first horizontal part 9a is hung on the inwardly-bent lower end portion of the side plate portion 50a on an outer side of the rail-like member 50, and the second horizontal part 9b is screwed with the bottom surface of the measuring box 42 by a screw 10 and a nut (not shown). Accordingly, the rail-like member 50 is sandwiched between the fixing member 9 and the protruding end portion 42aa of the measuring box 42, whereby the measuring box 42 is fixed to the pair of rail-like members 50.

In the present embodiment, when two screws 10 are respectively loosened, the measuring box 42 moves on the pair of rail-like members 50 in a sliding manner. As is understood from the description above, when the measuring box 42 moves, the motor box 410, the support member 43, the cover member 44 and the measuring conveyor 40 also move together with the measuring box 42. Therefore, the entire measuring portion 4 moves in a sliding manner when the measuring box 42 is moved in a sliding manner. Then, after the measuring portion 4 is moved, two screws 10 are fastened again, whereby the measuring portion 4 is fixed to the pair of rail-like members 50.

Note that the take-in box 32 of the take-in portion 3 has a shape similar to that of the measuring box 42, and is mounted onto the pair of rail-like members 50 in a similar manner to that of the measuring box 42.

As described above, in the weight checking apparatus 1 according to the present embodiment, the measuring portion 4 is mounted onto the pair of rail-like members 50 so that the position thereof is capable of being changed. Accordingly, it is possible to easily change the position of the measuring portion 4 in accordance with a change of specifications or addition of specifications.

For example, in a case where the take-in conveyor 30 is replaced with longer one in accordance with a change in type of the check object TR, in some cases, the take-in conveyor 30 is replaced without changing positions other than that of the take-in conveyor 30 of the take-in portion 3 due to a limitation in installation environment or the like. In such a case, the take-in conveyor 30 becomes longer toward the measuring conveyor 40, and thus the measuring portion 4 needs to be moved to the subsequent stage side. On the other hand, in a case where the take-in conveyor 30 is replaced with shorter one, a gap between the take-in conveyor 30 and the measuring conveyor 40 becomes large, and thus the measuring portion 4 needs to be moved to the preceding stage side.

Further, in the case where the measuring conveyor 40 is replaced with one having different length in accordance with a change in type of the check object TR, in some cases, the measuring conveyor 40 is replaced without changing the position of the take-in portion 3 due to a limitation in installation environment or the like. Also in this case, the measuring portion 4 needs to be moved to the preceding stage side or the subsequent stage side.

Further, in a case where another take-in portion 3 is additionally installed on the pair of rail-like members 50 between the measuring portion 4 and the take-in portion 3, in some cases, the original take-in portion 3 is not moved due to a limitation in installation environment of the weight checking apparatus 1 or the like. Also in this case, the measuring portion 4 needs to be moved.

In the cases as descried above, the screws 10 are loosened to cause the measuring portion 4 to move on the rail-like members 50 in a sliding manner, and thus the position of the measuring portion 4 is changed with ease, which enables swift adaptation to a change of specifications or addition of specifications.

Further, in the present embodiment, a part of the measuring portion 4, and more specifically, the lower portion 42b of the measuring box 42 is positioned between the pair of rail-like members 50. Accordingly, compared with the case where the entire measuring portion 4 is positioned above the rail-like members 50, the measuring portion 4 is kept at the lower position. An unnecessary vibration is likely to be applied to the measuring portion 4 as the position of the measuring portion 4 becomes higher. Therefore, it is possible to suppress a vibration to be applied to the measuring portion 4 by limiting the height of the position of the measuring portion 4, which prevents a decrease in measurement accuracy of the measuring portion 4.

Further, in the present embodiment, the measuring portion 4 and the take-in portion 3 are mounted onto the same rail-like members 50, whereby it is possible to prevent a change in height relationship between the conveying surface of the measuring portion 4 and the conveying surface of the take-in portion 3 even in a case where the position of the measuring portion 4 is changed. That is, it is possible to prevent the generation of positional deviation in the height direction of the conveying surface between the measuring portion 4 and the take-in portion 3. Accordingly, it is not required to adjust the height of the conveying surface between the measuring portion 4 and the take-in portion 3 after the position of the measuring portion 4 is changed.

Further, in the present embodiment, not only the measuring portion 4 but also the take-in portion 3 is mounted onto the pair of rail-like members 50 so that a position thereof is capable of being changed. Accordingly, it is possible to change not only the position of the measuring portion 4 but also the position of the take-in portion 3 by using the rail-like members 50. This enables flexible adaptation to a change of specifications or addition of specifications.

Note that while the measuring portion 4 and the take-in portion 3 are mounted onto the pair of rail-like members 50 in the present embodiment, there may be mounted, in the same manner, a sorting portion which performs a processing of sorting the check objects TR in accordance with the measurement results of the measuring portion 4. This sorting portion includes, at an upper end portion thereof, a conveyor for conveying the check object TR in the similar manner to those of the measuring portion 4 and the take-in portion 3, and the conveyor is disposed adjacent to the measuring conveyor 40 in the conveying direction of the check object TR. The sorting portion sorts check objects TR successively conveyed from the measuring portion 4 into a plurality of directions in accordance with the measurement results of the measuring portion 4, and conveys the check objects TR to the apparatus at the subsequent stage. As a method of sorting the check objects TR, there is known, for example, a method of blowing air to the check object TR from a jet nozzle provided in a vicinity of the conveyor.

Figure 11:
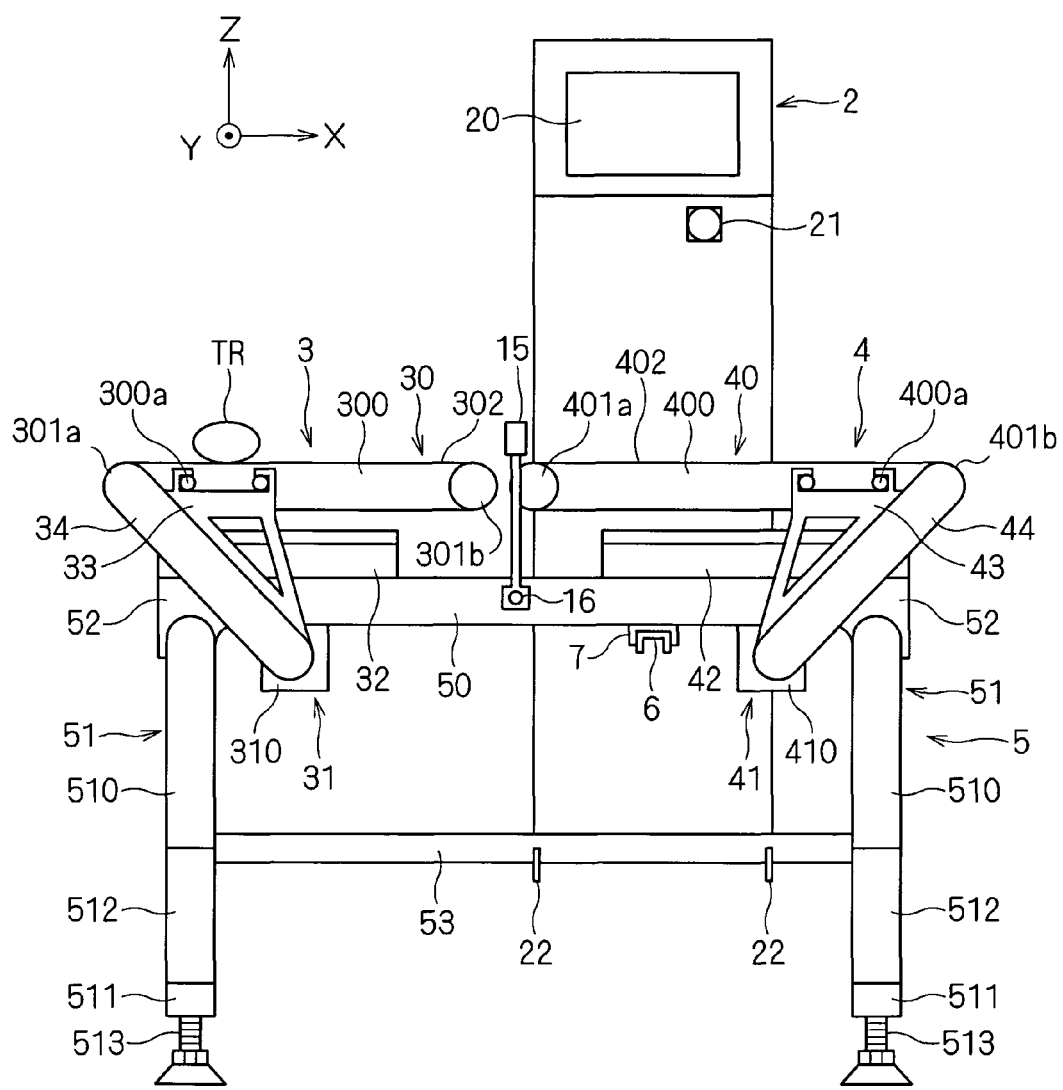
FIG. 11 is a view showing a state in which an optoelectronic sensor is detachably mounted onto the rail-like member.

Further, in addition to the measuring portion 4, the take-in portion 3 and the sorting portion, various devices may be detachably mounted onto the rail-like members 50. For example, as shown in FIG. 11, an optoelectronic sensor 15 which detects whether or not the check object TR is supplied to the measuring portion 4 may be detachably mounted onto the rail-like members 50 with a screw 16. Alternatively, a camera for identifying a label attached to the check object TR may be detachably mounted onto the rail-like members 50. Still alternatively, a side-belt conveying device for conveying a vertically long check object TR without toppling may be detachably mounted onto the rail-like members 50. Accordingly, addition of specifications is performed with ease.

Further, while the measuring portion 4 and the like are mounted onto two rail-like members 50 which are disposed in parallel with each other in the present embodiment, the measuring portion 4 and the like may be mounted onto one rail-like member 50 or three or more rail-like members 50 which are disposed in parallel with each other so that positions thereof are capable of being changed.

(Support Structure For Electrical Equipment Box)

Figure 12:
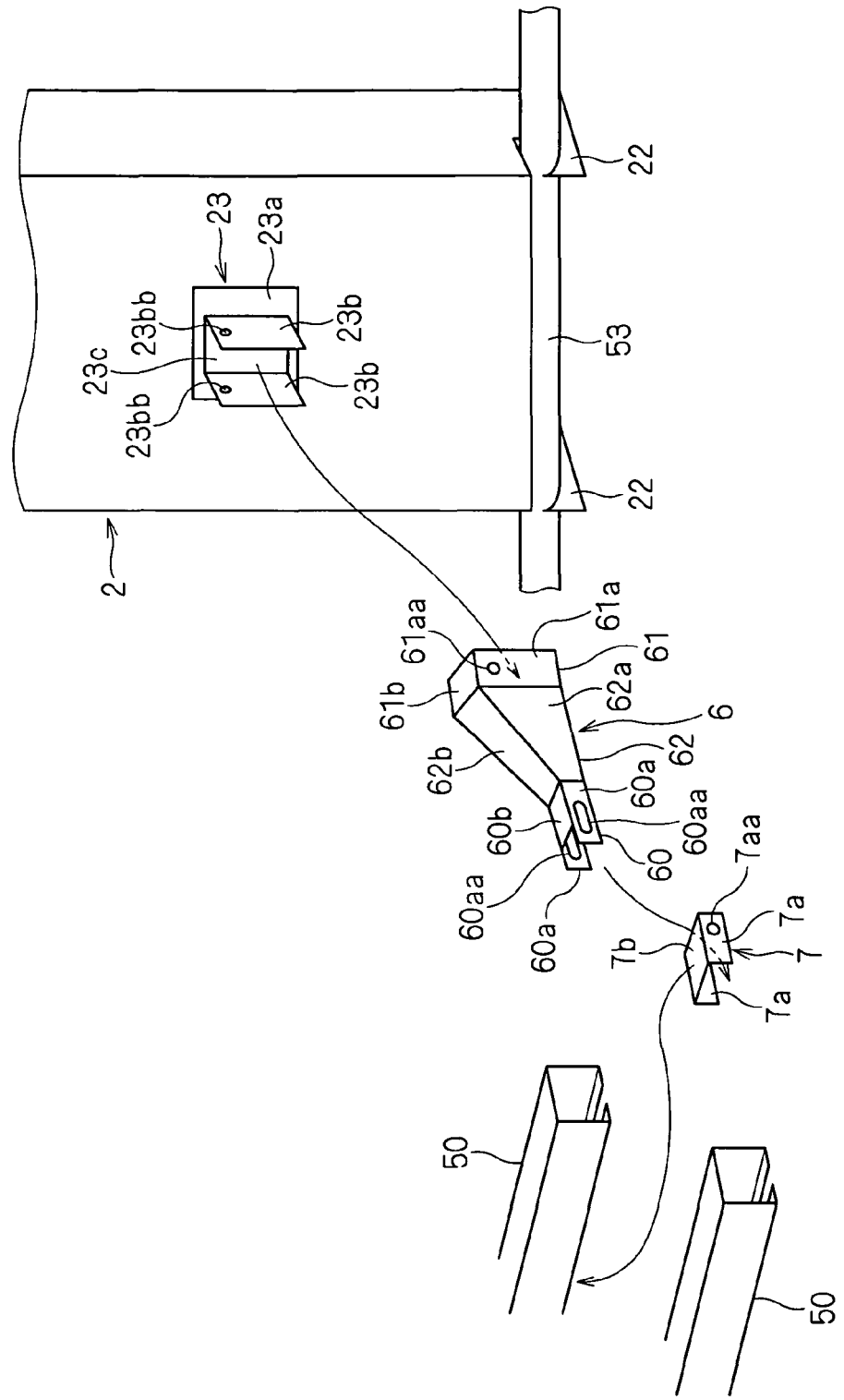
FIG. 12 is a view showing a method of fixing an electrical equipment box to a frame by a fixing member.

Next, a support structure for the electrical equipment box 2 will be described in detail. FIG. 12 is a view showing a method of fixing the electrical equipment box 2 to the frame 5 by the fixing member 6. As shown in FIG. 12 and the above-mentioned FIG. 8, the mounting bracket 7 is fixed to the bottom surface of the rail-like member 50 on the back side. The mounting bracket 7 has a shape in which a plate-like member is bent into a square-U-shape, and is composed of a pair of side plate portions 7a which are opposed to each other and a top plate portion 7b which connects upper ends of the pair of side plate portions 7a. A screw hole 7aa is provided in each of the pair of side plate portions 7a. In the mounting bracket 7, the top plate portion 7b is fixed to the bottom surface of the rail-like member 50 so that the pair of side plate portions 7a are opposed to each other in the long side direction (X-axis direction) of the rail-like member 50.

A mounting bracket 23 to which the fixing member 6 is mounted is fixed to the front surface of the electrical equipment box 2 with a screw or the like. The mounting bracket 23 includes a base plate 23a fixed to the electrical equipment box 2 and a pair of mounting plates 23b which protrude from the base plate 23 forward and are opposed to each other with a predetermined distance. An opening 23c is provided in a center of the base plate 23, and the pair of mounting plates 23b are connected to the base plate 23a so as to sandwich the opening 23c therebetween. A screw hole 23bb is provided at an upper end portion of each of the pair of mounting plates 23b. An opening is formed on the front surface of the electrical equipment box 2, and the mounting bracket 23 is mounted onto the front surface of the electrical equipment box 2 so that the pair of mounting plates 23b are opposed to each other in the X-axis direction and the opening of the electrical equipment box 2 and the opening 23c of the base plate 23a overlap each other. Note that wiring for electrically connecting the measuring portion 4 and the take-in portion 3 to the control portion of the electrical equipment box 2 and the like are inserted into the opening 23c of the mounting bracket 23 and the opening of the electrical equipment box 2.

The fixing member 6 is composed of a rail-side mounting portion 60 mounted to the mounting bracket 7 fixed to the rail-like member 50, an electrical-equipment-side mounting portion 61 mounted to the mounting bracket 23 fixed to the electrical equipment box 2, and a coupling portion 62 which couples the rail-side mounting portion 60 and the electrical-equipment-side mounting portion 61 to each other, and has a horizontally long shape as a whole.

The rail-side mounting portion 60 is composed of a pair of side plate portions 60a which are opposed to each other and a top plate portion 60b which connects upper ends of the pair of side plate portions 60a. Each of the pair of side plate portions 60a has a horizontally-long rectangular plate shape. An elongated hole 60aa extending along a longitudinal direction thereof is provided in each of the pair of side plate portions 60a. Note that the top plate portion 60b is not positioned at a tip portion (end portion on a side opposite to the end portion connecting to the coupling portion 62) of the rail-side mounting portion 60.

The electrical-equipment-side mounting portion 61 is composed of a pair of side plate portions 61a which are opposed to each other and a top plate portion 61b which connects upper ends of the pair of side plate portions 61a. Each of the pair of side plate portions 61a has a vertically-long rectangular plate shape, and a screw hole 61aa is provided at an upper end portion thereof.

The coupling portion 62 is composed of a pair of side plate portions 62a which are opposed to each other and a top plate portion 62b which connects upper ends of the pair of side plate portions 62a, and extends obliquely downward from the electrical-equipment-side mounting portion 61 to reach the rail-side mounting portion 60. One of the pair of side plate portions 62a couples one of the side plate portions 62a of the rail-side mounting portion 60 and one of the side plate portions 61a of the electrical-equipment-side mounting portion 61 to each other, whereas the other of the pair of side plate portions 62a couples the other side plate portion 60a of the rail-side mounting portion 60 and the other side plate portion 61a of the electrical-equipment-side mounting portion 61 to each other. Further, the upper plate portion 62b couples the upper plate portion 60b of the rail-side mounting portion 60 and the upper plate portion 61b of the electrical-equipment-side mounting portion 61 to each other.

When the fixing member 6 having the above-mentioned structure is mounted to the mounting bracket 23 fixed to the electrical equipment box 2, the electrical-equipment-side mounting portion 61 is caused to cover the pair of mounting plates 23b of the mounting bracket 23 so that two screw holes 61aa of the electrical-equipment-side mounting portion 61 of the fixing member 6 respectively overlap the screw holes 23bb of the pair of mounting plates 23b of the mounting bracket 23. Then, the overlapping screw holes 61aa and screw holes 23aa are screwed with from an outside of the electrical-equipment-side mounting portion 61. Accordingly, the electrical-equipment-side mounting portion 61 of the fixing member 6 is mounted to the mounting bracket 23.

On the other hand, when the fixing member 6 is mounted to the mounting bracket 7 fixed to the rail-like member 50, the rail-side mounting portion 60 is inserted into a space surrounded by the top plate portion 7b and the pair of side plate portions 7a of the mounting bracket 7 so that two elongated holes 60aa of the rail-side mounting portion 60 of the fixing member 6 and two screw holes 7aa of the mounting bracket 7 overlap each other. Then, a screw is caused to pass through from an inside of the rail-side mounting portion 60 through the elongated hole 60aa, and is screwed with the screw hole 7aa to be fastened. Accordingly, the rail-side mounting portion 60 of the fixing member 6 is mounted to the mounting bracket 7.

Figure 13:
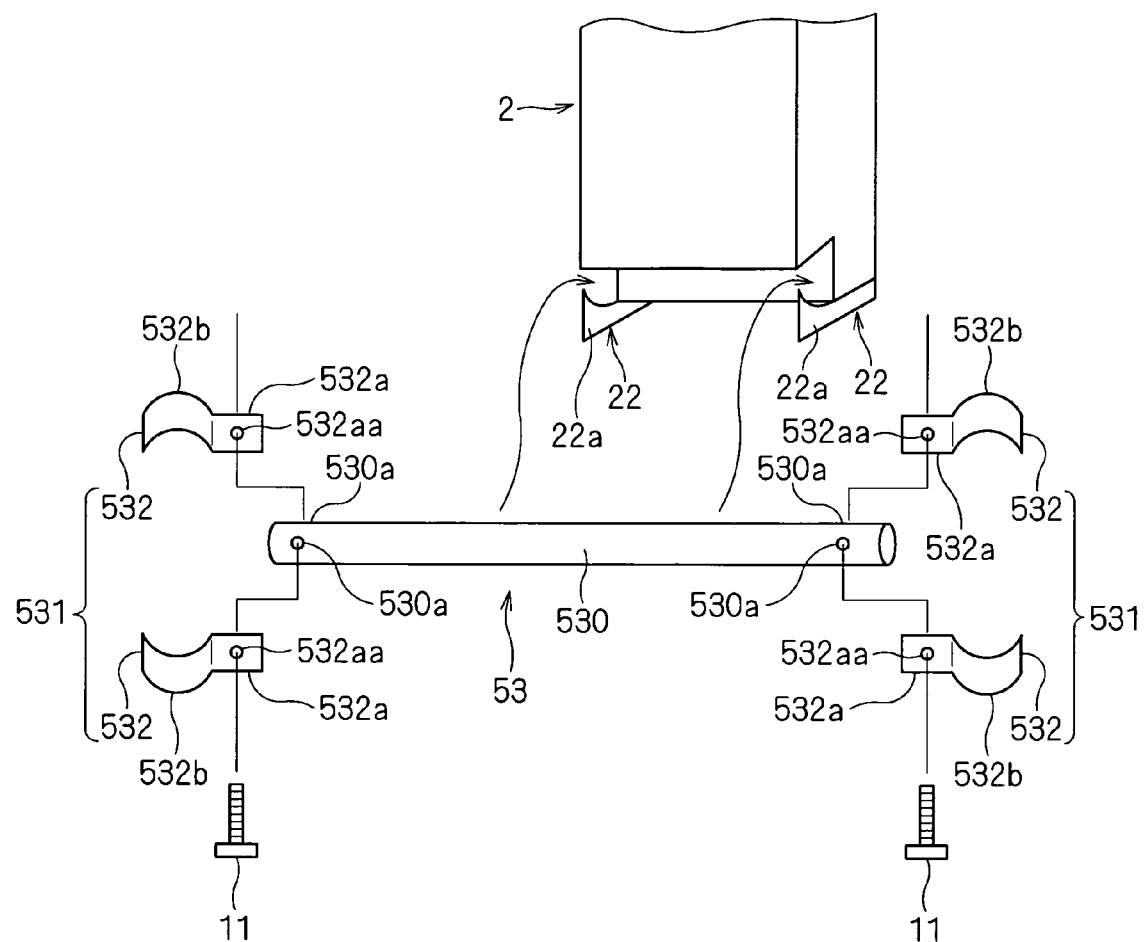
FIG. 13 is a view for describing an overall structure of a support member.
Figure 14:
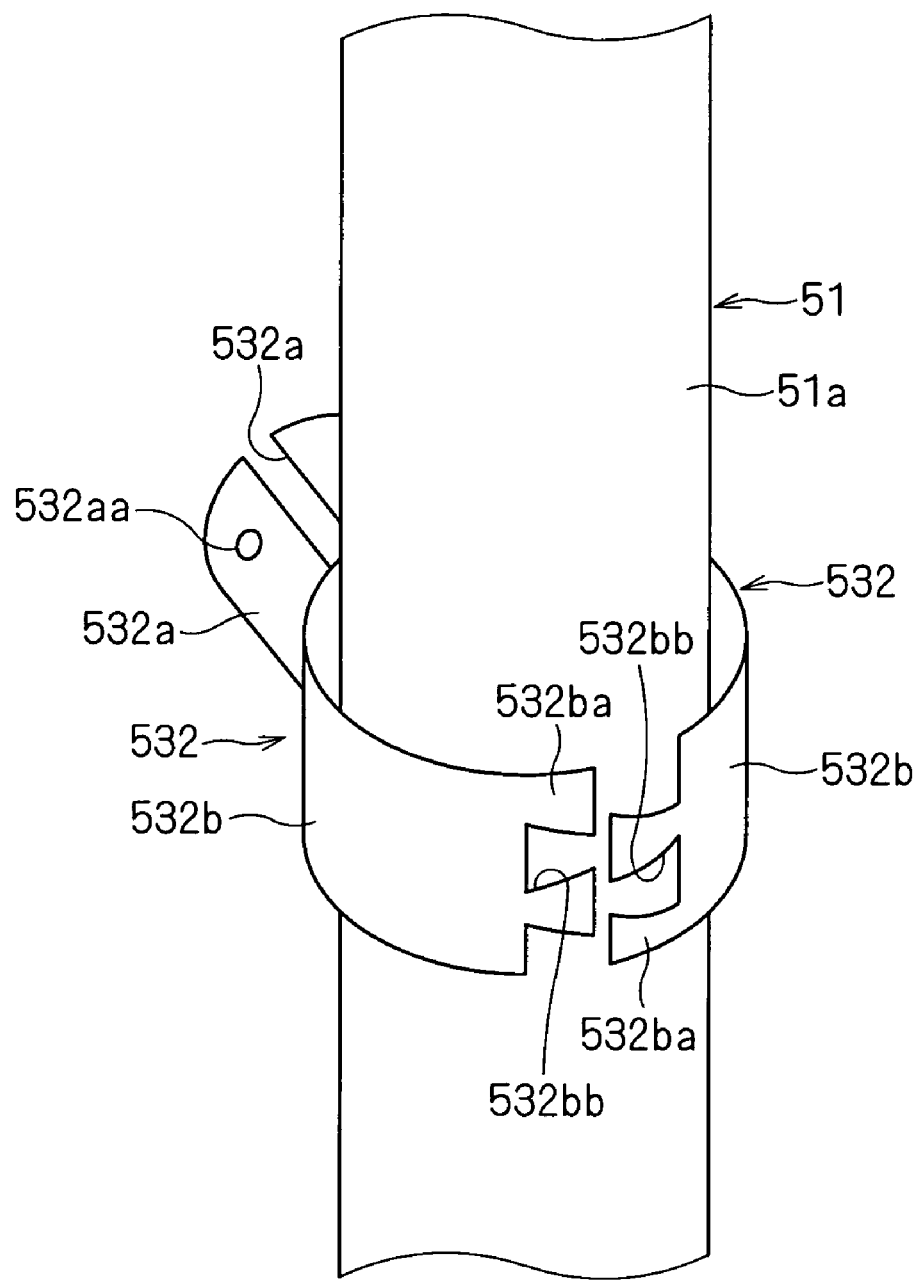
FIG. 14 is a view for describing a detailed structure of a mounting member included in the support member.

Next, a method of supporting the electrical equipment box 2 by the support member 53 of the frame 5 will be described. FIG. 13 is a view for describing an overall structure of the support member 53, and FIG. 14 is a view for describing a detailed structure of a mounting member 531 included in the support member 53.

As shown in FIG. 13 and the above-mentioned FIG. 8, the support member 53 includes a tubular member 530 which supports the electrical equipment box 2 and has a round pipe shape and two mounting members 531 for mounting the tubular member 530 to a pair of leg members 51. A pair of screw holes 530a which are disposed to be opposed to each other are provided at each of both end portions of the tubular member 530, and the mounting members 531 are fixed to the tubular member 530 using the pair of screw holes 530a.

A front surface at a lower end portion of the electrical equipment box 2 is dented, and the mounting bracket 22 is mounted to a bottom surface of the lower end portion. The mounting bracket 22 includes a pair of protruding portions 22a which protrude forward beyond a front surface of the lower end portion of the electrical equipment box 2, and upper end surfaces of the pair of protruding portions 22a are bent correspondingly to an outer peripheral surface of the tubular member 530. The tubular member 530 is inserted into a dent part which is formed as a result of the front surface at the lower end portion of the electrical equipment box 2 being bent, and is sandwiched between the pair of protruding portions 22a of the mounting bracket 22 therebelow and the electrical equipment box 2. As a result, the electrical equipment box 2 is supported by the tubular member 530.

Two mounting members 531 are respectively mounted to both end portions of the tubular member 530. Each of the mounting members 531 is composed of a pair of part members 532 which are used by being combined with each other. Each of the part members 532 is composed of a fixing part 532a fixed to an end portion of the tubular member 530 and a holding part 532b which is continuous with the fixing part 532a and holds the leg member 51.

The fixing part 532a has a shape in which a plate-like part is bent correspondingly to the outer peripheral surface of the tubular member 530, and is provided with a screw hole 532aa at a center part thereof. A pair of part members 532 are combined with each other, whereby a pair of fixing parts 532a thereof have a cylinder shape as a whole, and an inner peripheral surface thereof has a shape corresponding to the outer peripheral surface of the tubular member 530. In the case of combining the pair of part members 532 with each other to be mounted to the end portion of the tubular member 530, the end portion of the tubular member 530 is sandwiched between the pair of fixing parts 532a so that the screw holes 532aa of the pair of fixing parts 532a and the pair of screw holes 530a at the end portion of the tubular member 530 overlap each other, and the screw 11 is screwed with the overlapping screw holes 532aa and screw holes 530a from an outside thereof so as to penetrate through the pair of fixing parts 532a and the end portion of the tubular member 530 sandwiched therebetween. Then, a nut is fastened to the screw 11. Accordingly, the pair of fixing parts 532a become cylindrical as a whole, and is mounted to the end portion so as to cover the end portion of the tubular member 530.

Further, as shown in FIGS. 8, 13 and 14, the pair of holding parts 532b of one of the mounting members 531 hold a vertical part 51a on the back side, which extends in the Z-axis direction in one of the leg members 51, and the pair of holding parts 532b of the other mounting member 531 hold a vertical part 51a on the back side, which extends in the Z-axis direction in the other leg member 51. As a result, the support member 53 is disposed between the vertical parts 51a on the back side of the pair of leg members 51.

Each holding part 532b has a shape in which the plate-like part is bent correspondingly to the outer peripheral surface of the vertical part 51a of the leg member 51. The pair of part members 532 are combined with each other as described above to be mounted to the end portion of the tubular member 530, whereby the holding parts 532b thereof form a cylindrical shape having an inner peripheral surface which corresponds to the outer peripheral surface of the vertical part 51a of the leg member 51, as a whole, and hold the vertical part 51a of the leg member 51 so as to surround a part thereof.

Further, as shown in FIGS. 8 and 14, each holding part 532b is provided with a plurality of projecting portions 532ba at a tip thereof. Each projecting portion 532ba has a tapered shape in a manner that a width thereof becomes narrower as closer to the fixing part 532a (as closer to a root). Between the projecting portions 532ba, there is formed a taper-shaped clearance 532bb which becomes larger in width as closer to the fixing part 532a. When the pair of part members 532 are mounted to the tubular member 530, the fixing parts 532a thereof are screwed with the end portion of the tubular member 530 by the screw 11 in the state where tip portions of the part members 532 are fitted with each other so that the projecting portion 532ba of the holding part 532b of one of the part members 532 is fitted with the clearance 532bb of the holding part 532b of the other of the part members 532. Accordingly, the tip portions of the pair of part members 532, which are fitted with each other, are difficult to become detached against a force along a circumferential direction of the vertical part 51a of the leg member 51.

In the present embodiment, the mounting member 531 is firmly fastened to the leg member 51 when the screw 11 is firmly fastened to the fixing part 532a, whereby the support member 53 is fixed to the leg member 51. On the other hand, the mounting member 531 is loosely fastened to the leg member 51 when the screw 11 is loosened, whereby the support member 53 is not fixed to the leg member 51.

Figure 15:
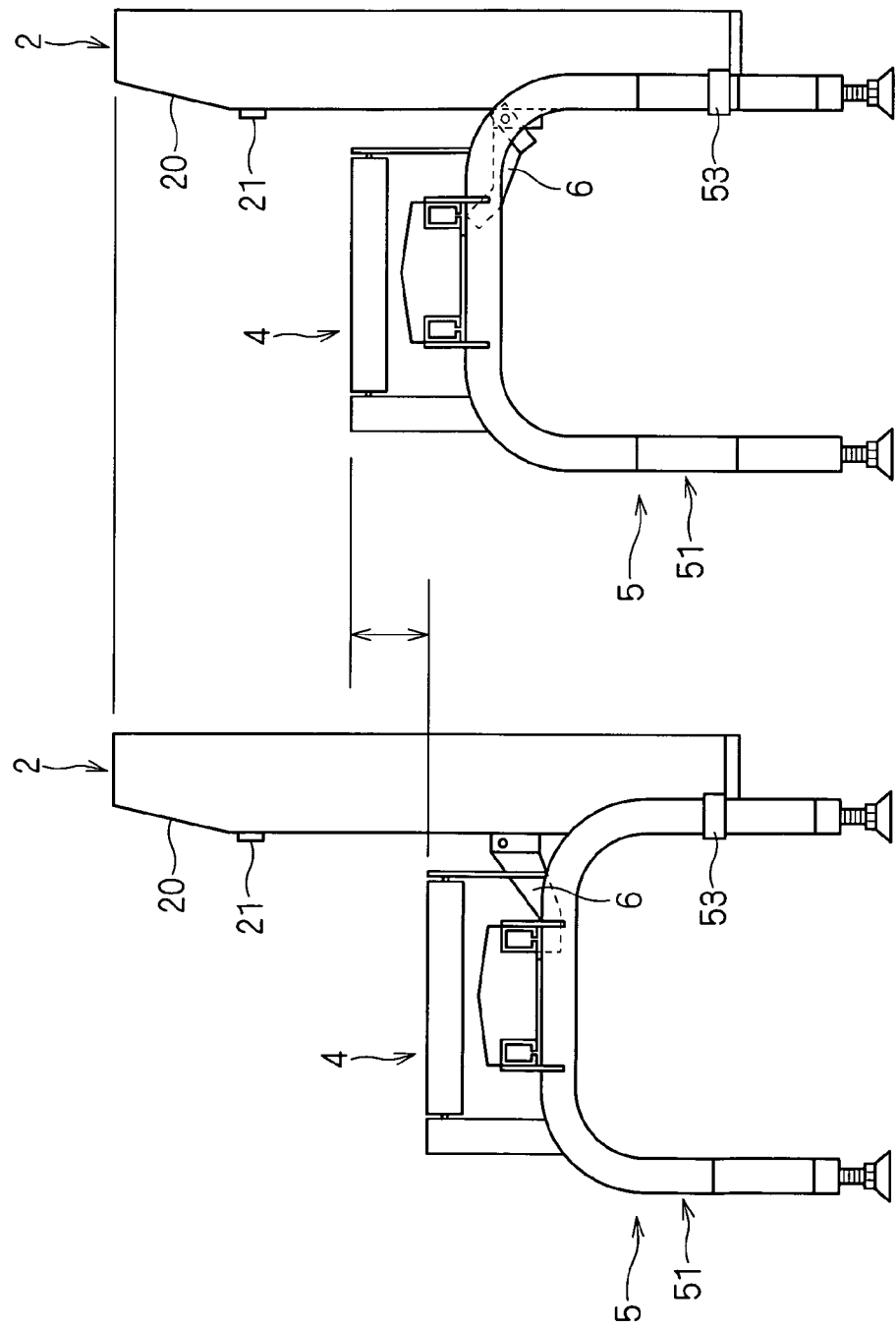
FIG. 15 is a view showing the weight checking apparatus according to the present embodiment before and after a height of the leg member is adjusted.

In the weight checking apparatus 1 according to the present embodiment, which has the structure described above, the height of the leg member 51 is adjusted without changing the position of the operation portion 20. That is, it is possible to adjust the height of the conveying surface for the check object TR in the measuring portion 4 and the take-in portion 3 without changing the position of the operation portion 20. FIG. 15 is a view showing states thereof. The left part of the view shows the state of the weight checking apparatus 1 in a case where the leg member 51 is decreased in height, whereas the right part thereof shows the state of the weight checking apparatus 1 in a case where the leg member 51 is increased in height.

As described above, in the weight checking apparatus 1, the fixing member 6 and the support member 53 support the electrical equipment box 2 and fix the electrical equipment box 2 to the frame 5. If the electrical equipment box 2 is always fixed to the frame 5, the position of the electrical equipment box 2 also changes as the height of the pair of leg members 51 is adjusted using the second leg portions 511 of the pair of leg members 51. As a result, the position of the operation portion 20 changes as well. An operator has difficulty in operating the operation portion 20 if the position of the operation portion 20 also changes every time the height of the frame 5 changes.

In the present embodiment, one end of the fixing member 6 is screwed with the mounting bracket 7 fixed to the rail-like member 50, while the other end thereof is screwed with the mounting bracket 23 fixed to the electrical equipment box 2. Accordingly, when the screws which screw with the mounting brackets 7 and 23 are loosened, fixing of the fixing member 6 to the mounting brackets 7 and 23 is released.

On the other hand, in the support member 53, fastening of the mounting member 531 to the leg member 51 is loosened when the screw 11 fastened to the screw holes 532aa of the mounting member 531 and the screw holes 530a of the tubular member 530 is loosened, as described above. Accordingly, it is possible to release fixing of the support member 53 to the pair of leg members 51.

In the weight checking apparatus 1, in the case of changing the height of the pair of leg members 51, as a first step, in the state where the electrical equipment box 2 is supported, fixing of the fixing member 6 to the mounting brackets 7 and 23 is first released and fixing of the support member 53 to the pair of leg members 51 is released. Then, in the state where the position of the electrical equipment box 2 is maintained, each of the pair of second leg portions 511 is caused to rotate about the shaft center thereof, thereby changing an intrusion amount of each screw portion 511a into the first leg portion 510. After that, the fixing member 6 is fixed to the mounting brackets 7 and 23, and the support member 53 is fixed to the pair of leg members 51. As a result, it is possible to adjust the height of the pair of leg members 51 without changing the position of the operation portion 20.

Note that a distance between the mounting bracket 23 fixed to the electrical equipment box 2 and the mounting bracket 7 fixed to the rail-like member 50 changes when the height of the pair of leg members 51 is adjusted in the state where the position of the electrical equipment box 2 is maintained. However, the rail-side mounting portion 60 of the fixing member 6 is provided with elongated holes 60aa extending in the longitudinal direction of the fixing member 6, with the result that it is possible to absorb a change in distance between the mounting bracket 23 and the mounting bracket 7 by the elongated holes 60aa.

As described above, in the present embodiment, the electrical equipment box 2 is supported by the frame 5 so that the height of the pair of leg members 51 is adjusted so as not to change the position of the operation portion 20. Accordingly, even in a case where the height of the pair of leg members 51 is adjusted, the position of the operation portion 20 does not change, whereby it is possible to maintain operability of the operation portion 20.

While the invention has been shown and described in detail, the foregoing description is in all aspects illustrative and not restrictive. It is therefore understood that numerous modifications and variations can be devised without departing from the scope of the invention.

The invention claimed is:

1. A weight checking apparatus checking a weight of a check object, comprising:
   a measuring portion including a first conveying portion conveying a check object and measuring the weight of said check object conveyed by the first conveying portion;
   a processing portion including a second conveying portion conveying said check object and separating said check object from other subsequent check objects to convey said check object to said first conveying portion; and
   at least one rail extending horizontally along a conveying direction of said check object, onto which said measuring portion and said processing portion are mounted so that positions of said measuring and processing portions are capable of being independently changed in a horizontal direction.

2. The weight checking apparatus according to claim 1, wherein said at least one rail is a plurality of rails disposed in parallel with each other and wherein at least a part of said measuring portion is positioned between said plurality of rails.

3. The weight checking apparatus according to claim 1, wherein said first and second conveying portions are disposed adjacent to each other along said conveying direction, a measuring conveyor included in said first conveying portion is detachably mounted onto said measuring portion, and a take-in conveyor included in said second conveying portion is detachably mounted onto said processing portion.

* * * * *